United States Patent
Aikawa (10) Patent No.: US 10,340,715 B2
(45) Date of Patent: Jul. 2, 2019

(54) POWER CONTROL APPARATUS, POWER CONTROL METHOD, AND POWER CONTROL SYSTEM

(71) Applicant: KYOCERA CORPORATION, Kyoto-Shi, Kyoto (JP)

(72) Inventor: Shinji Aikawa, Yokohama (JP)

(73) Assignee: KYOCERA Corporation, Kyoto (JP)

( * ) Notice: Subject to any disclaimer, the term of this patent is extended or adjusted under 35 U.S.C. 154(b) by 51 days.

(21) Appl. No.: 15/528,616

(22) PCT Filed: Nov. 27, 2015

(86) PCT No.: PCT/JP2015/005929
§ 371 (c)(1),
(2) Date: May 22, 2017

(87) PCT Pub. No.: WO2016/084392
PCT Pub. Date: Jun. 2, 2016

(65) Prior Publication Data
US 2017/0256975 A1 Sep. 7, 2017

(30) Foreign Application Priority Data
Nov. 27, 2014 (JP) .................................. 2014-240603

(51) Int. Cl.
*H02J 7/00* (2006.01)
*H02J 3/14* (2006.01)
(Continued)

(52) U.S. Cl.
CPC ............ *H02J 7/0068* (2013.01); *G06Q 50/06* (2013.01); *H02J 3/14* (2013.01); *H02J 3/32* (2013.01); *H02J 7/007* (2013.01); *H02J 13/0017* (2013.01)

(58) Field of Classification Search
USPC ........................................ 320/101, 134, 136
See application file for complete search history.

(56) References Cited

U.S. PATENT DOCUMENTS 9,711,989 B2 * 7/2017 Shin .................... H02J 7/007
2005/0207081 A1 * 9/2005 Ying .................... H01H 9/32
361/105

(Continued)

FOREIGN PATENT DOCUMENTS

CN 203800621 U 8/2014
EP 2571130 A2 3/2013
(Continued)

OTHER PUBLICATIONS

International Search Report dated Feb. 16, 2016, issued by Japan Patent Office for International Application No. PCT/JP2015/005929.

(Continued)

*Primary Examiner* — Brian Ngo
(74) *Attorney, Agent, or Firm* — Procopio Cory Hargreaves and Savitch LLP (57) ABSTRACT

A storage cell is driven more flexibly with respect to the power supply state of a commercial grid. A power control apparatus (1) connects to a grid, is capable of controlling charging and discharging of a storage cell (22), and includes a controller (11) that performs leveling control to reduce a difference from a power purchase amount, which is established in a power purchase plan, by controlling charging and discharging of the storage cell (22). The controller (11) further performs control, upon acquiring a demand response request issued over a network, to make a comparison between the current amount of stored power in the storage cell (22) and the necessary amount of stored power for complying with the demand response request and to set a target power for power purchase in the leveling control on the basis of the result of the comparison.

8 Claims, 8 Drawing Sheets

(51) Int. Cl.
*H02J 3/32* (2006.01)
*G06Q 50/06* (2012.01)
*H02J 13/00* (2006.01)

(56) References Cited

U.S. PATENT DOCUMENTS

2012/0228935 A1* 9/2012 Nakashima ............... H02J 3/32
307/24
2013/0147421 A1* 6/2013 Shin ........................ H02J 7/007
320/101

FOREIGN PATENT DOCUMENTS

| | | |
|---|---|---|
| JP | 2000-333369 A | 11/2000 |
| JP | 2003-32899 A | 1/2003 |
| JP | 2011-130649 A | 6/2011 |
| JP | 2011-188559 A | 9/2011 |
| JP | 2014-50198 A | 3/2014 |
| JP | 2014-168315 A | 9/2014 |

OTHER PUBLICATIONS

Written Opinion of the International Searching Authority dated Feb. 16, 2016, issued by Japan Patent Office for International Application No. PCT/JP2015/005929.
Extended European Search Report dated Apr. 10, 2018, issued by the European Patent Office in counterpart European Patent Application No. 15 862626.7.

* cited by examiner

POWER CONTROL APPARATUS, POWER CONTROL METHOD, AND POWER CONTROL SYSTEM

CROSS-REFERENCE TO RELATED APPLICATION

This application claims priority to and the benefit of Japanese Patent Application No. 2014-240603 filed Nov. 27, 2014, the entire contents of which are incorporated herein by reference.

TECHNICAL FIELD

The present disclosure relates to a power control apparatus, a power control method, and a power control system.

BACKGROUND

There are known systems that charge a storage cell (secondary battery) from a power generation apparatus when power usage is less than the power supply and no power supply from the power grid is necessary. Conversely, when power needs to be supplemented, these systems immediately discharge the storage cell (for example, see JP 2003-032899 A (PTL 1)).

CITATION LIST

Patent Literature

PTL 1: JP 2003-032899 A

SUMMARY

Technical Problem

In PTL 1, however, the system needs to be improved so as to more flexibly control the storage cell with respect to the power supply state of the commercial power grid.

Therefore, it would be helpful to provide a power control apparatus, a power control method, and a power control system that can control a storage cell more flexibly with respect to the power supply state of the commercial power grid.

Solution to Problem

A power control apparatus according to one of the embodiments of the present disclosure connects to a grid and is capable of controlling charging and discharging of a storage cell, and the power control apparatus includes:

a controller configured to reduce a difference from a power purchase amount by controlling charging and discharging of the storage cell, the power purchase amount being established in a power purchase plan;

such that the controller is further configured, upon acquiring a demand response request issued over a network, to make a comparison between a current amount of stored power in the storage cell and a necessary amount of stored power for complying with the demand response request and to set a target power for power purchase on the basis of a result of the comparison.

A power control method according to one of the embodiments of the present disclosure is a power control method used in a power control apparatus that connects to a grid and is capable of controlling charging and discharging of a storage cell, the power control method including:

when a difference from a power purchase amount is reduced by controlling charging and discharging of the storage cell, the power purchase amount being established in a power purchase plan, making a comparison, upon acquiring a demand response request issued over a network, between a current amount of stored power in the storage cell and a necessary amount of stored power for complying with the demand response request and to set a target power for power purchase on the basis of a result of the comparison.

A power control system according to one of the embodiments of the present disclosure includes:

a power storage apparatus comprising a storage cell; and a power control apparatus that connects to a grid and is capable of controlling charging and discharging of the storage cell;

such that the power control apparatus comprises a controller configured to perform leveling control to reduce a difference from a power purchase amount by controlling charging and discharging of the storage cell, the power purchase amount being established in a power purchase plan; and the controller is further configured, upon acquiring a demand response request issued over a network, to make a comparison between a current amount of stored power in the storage cell and a necessary state of charge for complying with the demand response request and to set a target power for power purchase in the leveling control on the basis of a result of the comparison.

Advantageous Effect

A power control apparatus, a power control method, and a power control system according to the present disclosure can control a storage cell more flexibly with respect to the power supply state of the commercial power grid.

DETAILED DESCRIPTION

The following describes one of the embodiments of the present disclosure on the basis of the drawings.

[System Configuration]

Figure 1:
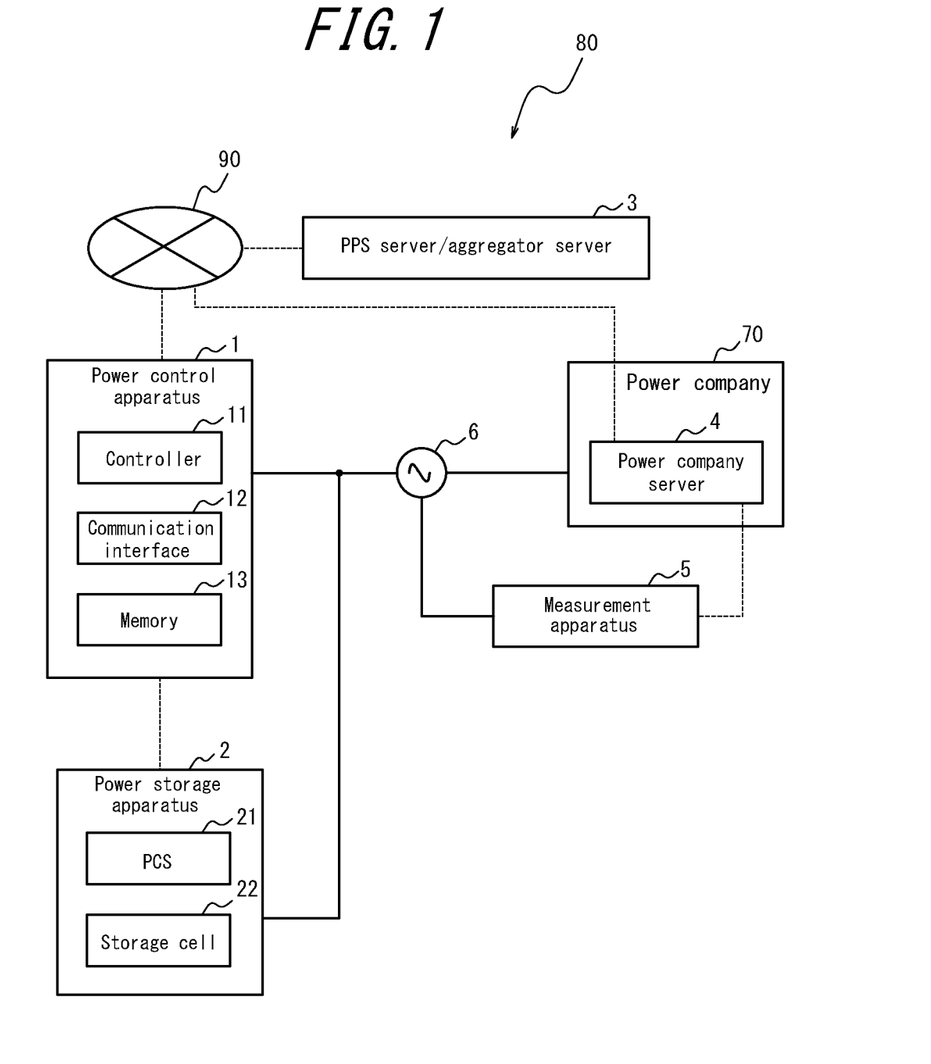
FIG. 1 is a functional block diagram of a power control system according to one of the disclosed embodiments.

FIG. 1 depicts lines connecting blocks, indicating control lines and information transmission lines by dashed lines, and indicating power lines by solid lines. A power control system 80 at least includes a power control apparatus 1 and a power storage apparatus 2 that connects to a grid 6 (commercial power grid). The power control system 80 in this embodiment is provided in a consumer's facility. The functions of the power control system 80 according to an embodiment of the present disclosure are described below, in which, however, other functions included in the power control system 80 are in no way excluded.

The power control apparatus 1 includes a controller 11, a communication interface 12, and a memory 13. The power control apparatus 1 is, for example, a Home Energy Management System (HEMS).

The controller 11 is, for example, a processor that controls the power control apparatus 1 overall, starting with the functional components of the power control apparatus 1.

The controller 11 acquires and complies with a demand response request issued over the network 90 side. A demand response request is a request issued by a power company, an aggregator, or the like to a consumer's facility to reduce the power usage. The demand response request is issued in advance, such as the day before or a predetermined time before, when the power supply is predicted to be tight. A consumer who complies with the demand response request can enjoy the benefit of an economic incentive. As one example in this embodiment, the demand response request is described as being issued a predetermined time in advance on the current day.

The controller 11 also levels an imbalance using a storage cell 22.

An imbalance refers to a difference between the power usage (purchase) in a power purchase plan and the actual power usage. Leveling the imbalance refers to the consumer controlling the charging and discharging of the storage cell 22 using the power control apparatus 1 so as to reduce this difference. As one example in this embodiment, leveling the imbalance refers to suppressing the difference to be between −3% and 3%.

Figure 2:
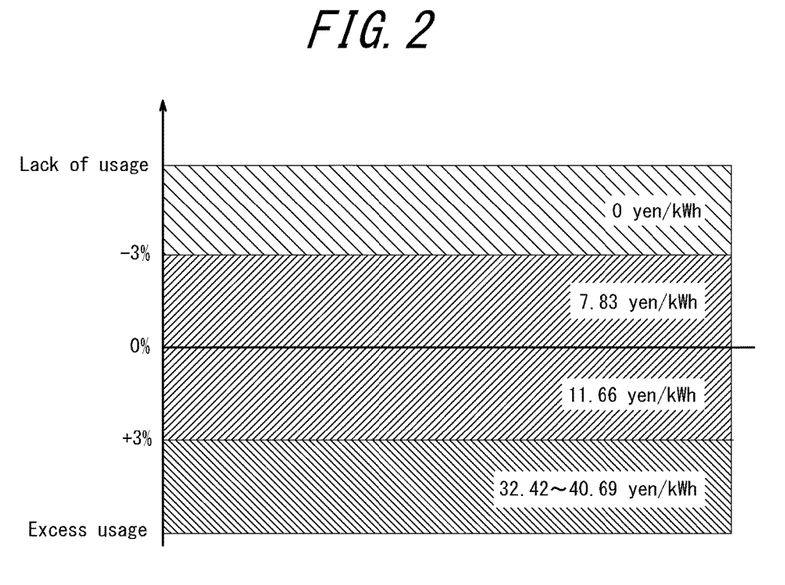
FIG. 2 illustrates an example of an imbalance fee.

The following describes the economic effect of imbalance leveling on the consumer. When establishing a power purchase plan, the consumer plans the power usage and agrees to purchase power at a predetermined unit price for the power usage. As illustrated in FIG. 2, when a lack of usage occurs and the difference falls below −3%, the consumer can sell generated power at a first unit price (for example, 0 yen) to a power supplier (for example, a general electricity utility, a Power Producer and Supplier (PPS), or the like). Also, when a lack of usage occurs and the difference is between −3% and 0%, the consumer can sell generated power at a second unit price (for example, 7.83 yen/kWh) that is higher than the first unit price. Accordingly, when the actual excess usage is within a predetermined range with respect to the planned power purchase amount, the consumer is awarded an economic benefit.

When excess usage occurs and the difference is between 0% and 3%, the consumer must purchase generated power from the power supplier at a third unit price that is higher than the second unit price (for example, 11.66 yen/kWh). If the difference exceeds 3%, the consumer must purchase generated power at a fourth unit price that is higher than the third unit price (for example, 32.42 to 40.69 yen/kWh). Accordingly, as the planned power purchase amount is increasingly insufficient compared to the actual power purchase amount, the consumer suffers an economic penalty.

The imbalance is leveled by having the storage cell 22 absorb the difference between the power purchase amount established by the power purchase plan and the power usage of power actually consumed by the consumer's facility. For example, the controller 11 compensates for a power shortage by discharging the storage cell 22 when the power usage is greater than the power purchase amount and consumes excess power by charging the storage cell 22 when the power usage is less than the planned power purchase amount, thereby eliminating the imbalance.

The controller 11 calculates a predicted value of the power usage after a predetermined time (in this embodiment, the next day) by any method. Details are provided below. On the basis of the predicted value of the power usage, the controller 11 can use any method to calculate the necessary amount of stored power for implementing the leveling. For example, the memory 13 may store, in advance, an association between the predicted value of the power usage and the necessary amount of stored power for implementing the leveling. In the calculation, the controller 11 may then refer to the memory 13 to calculate the necessary amount of stored power for implementing the leveling. As an alternative example, the controller 11 may use any calculation algorithm to calculate, on the basis of the predicted value of the power usage, the necessary amount of stored power for implementing the leveling. As the predicted value of the power usage is larger, the necessary amount of stored power for implementing the leveling is higher.

When the amount of stored power in the below-described storage cell 22 is lacking, the controller 11 sets a target power for leveling with respect to the planned power purchase amount (hereinafter, the "target power for leveling with respect to the planned power purchase amount" is referred to as the "target power for power purchase in the leveling control") to a first target value that is greater than 0% (in this embodiment, +3%). As a result, the storage cell 22 is charged, and the insufficiency in the amount of stored power can be eliminated. When the storage cell 22 has an excessive amount of stored power, the controller 11 sets the target power for power purchase in the leveling control to a second target value that is less than 0% (in this embodiment, −3%). As a result, the storage cell 22 is discharged, and the amount of stored power can be reduced. In this way, the control to reduce the amount of stored power is implemented when, for example, leveling is possible with small power variation and a state of charge of less than 100%. The state of charge is the value yielded by dividing the amount of stored power in the storage cell 22 by the rated capacity.

The controller 11 can comply with demand response during leveling. The controller 11 acquires information on the current amount of stored power in the storage cell 22 from the power storage apparatus 2 and compares this amount of stored power with the necessary amount of stored power for complying with the demand response. The necessary amount of stored power for complying with the demand response is, for example, stored in the memory 13 in advance. On the basis of the results of this comparison, the controller 11 sets the target power for power purchase in the leveling control. In this way, the controller 11 can perform control to charge and discharge the storage cell 22. The controller 11 can also acquire power amount information measured by a meter device (the amount of power supplied by the grid 6 and the power usage for power consumed by load devices) and store the power amount information in the memory 13. Furthermore, the controller 11 can store the actual measured outside air temperature each day in the memory 13.

The communication interface 12 interfaces communication between the power storage apparatus 2 and a PPS server/aggregator server 3 by a wired or wireless connection.

The memory 13 is configured using any memory resource, such as a flash memory. The memory 13 stores a variety of information, programs for causing the power control apparatus 1 to operate, and the like and also functions as a working memory. The memory 13 for example stores the power amount information measured by the meter device.

The power storage apparatus 2 includes a Power Conditioning System (PCS) 21 and the storage cell 22. On the basis of control by the power control apparatus 1, the power storage apparatus 2 performs charging and discharging of the storage cell 22.

The PCS 21 includes an inverter, an AC/DC converter, a two-way DC/DC converter, and the like. The PCS 21 converts AC power supplied from the grid 6, a power generation apparatus, and the like to DC power and outputs this DC power to the storage cell 22 to charge the storage cell 22. Also, the PCS 21 converts DC power acquired from the storage cell 22 to AC power and outputs the AC power to the load devices.

The storage cell 22 charges and discharges as a result of control by the power control apparatus 1.

On behalf of the power company server 4, the PPS server/aggregator server 3 can issue a demand response request to the power control apparatus 1.

The power company sever 4 is provided internal to or external to a power company 70 by the power company 70 and outputs demand response requests over the network 90.

The measurement apparatus 5 measures the power state of the grid 6 (for example, frequency variation) and outputs the information of the measurement to the power company server 4. On the basis of the acquired information, the power company server 4 determines whether to issue a demand response request. In general, the measurement apparatus 5 is provided at a position at which power is output to the grid 6 from a power plant.

The following describes an embodiment of the present disclosure in greater detail.

At any time interval, such as once a day, the controller 11 acquires power amount information from the memory 13 and acquires the current amount of stored power in the storage cell 22 from the power storage apparatus 2.

The controller 11 calculates a predicted value of the power usage on the next day. As one example, the controller 11 calculates the predicted value of the power usage on the next day by calculating (the moving average of the power usage over a recent predetermined number of days)×((the predicted outside air temperature on the next day)/(the moving average of the outside air temperature over a recent predetermined number of days)).

The controller 11 for example seeks information necessary for calculating the predicted value as follows. Namely, on the basis of the power amount information acquired from the memory 13, the controller 11 can calculate the moving average of the power usage over a recent predetermined number of days. The controller 11 can also acquire a predicted value for the outside air temperature on the next day at a predetermined time each day from a server or the like that provides the predicted value. Furthermore, the controller 11 can read the actual measured outside air temperature each day from the memory 13 and calculate the moving average of the outside air temperature over a recent predetermined number of days.

The controller 11 calculates a target amount of stored power that is necessary in order to implement imbalance leveling on the next day on the basis of the calculated power usage.

As described below, the controller 11 compares the target amount of stored power with the current amount of stored power, and on the basis of the result of this comparison, the controller 11 sets the target power for power purchase in the leveling control to be within a range over which an imbalance fee per unit amount of power varies.

In other words, when determining that the current amount of stored power is less than the target amount of stored power, the controller 11 sets the target power for power purchase in the leveling control for the next day to the first target value (+3%).

When determining that the current amount of stored power and the target amount of stored power are the same, the controller 11 sets the target power for power purchase in the leveling control for the next day to a reference value (0% in this embodiment). The reference value is a value less than the first target value and is the value when the power purchase amount established in the power purchase plan matches the actual power usage at a corresponding time in the power purchase plan.

When determining that the current amount of stored power is greater than the target amount of stored power, the controller 11 sets the target power for power purchase in the leveling control for the next day to the second target value (−3%). The second target value is a smaller value than the reference value.

On the next day, the controller 11 performs leveling control using the storage cell 22 to achieve the target power for power purchase in the leveling control as calculated by the controller 11 on the previous day. A specific example is as follows.

Figure 3A:
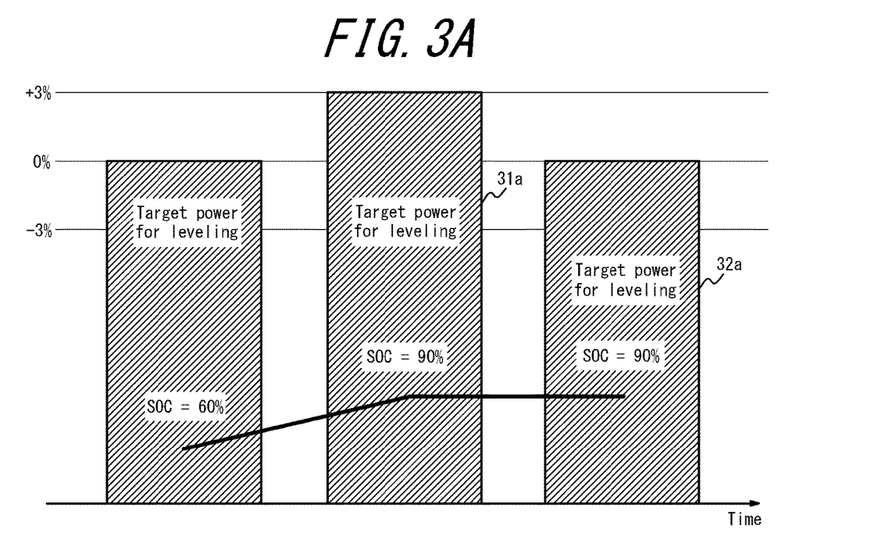
FIG. 3A illustrates an example of leveling control when increasing the amount of stored power.

For example, charging/discharging control when the target amount of stored power is 90% in terms of the State Of Charge (SOC) and the current amount of stored power is 60% in terms of the SOC is illustrated in FIG. 3A. The controller 11 may gradually decrease the target power for power purchase in the leveling control as the amount of stored power in the storage cell 22 increases. When the amount of stored power in the storage cell 22 reaches the target amount of stored power (SOC of 90%) (31a in FIG. 3A), the controller 11 sets the target power for power purchase in the leveling control to the reference value (0%) (32a in FIG. 3A).

A figure and description of the charging/discharging control when the target amount of stored power and the current amount of stored power are the same (for example, when both are a SOC of 70%) are omitted.

Figure 3B:
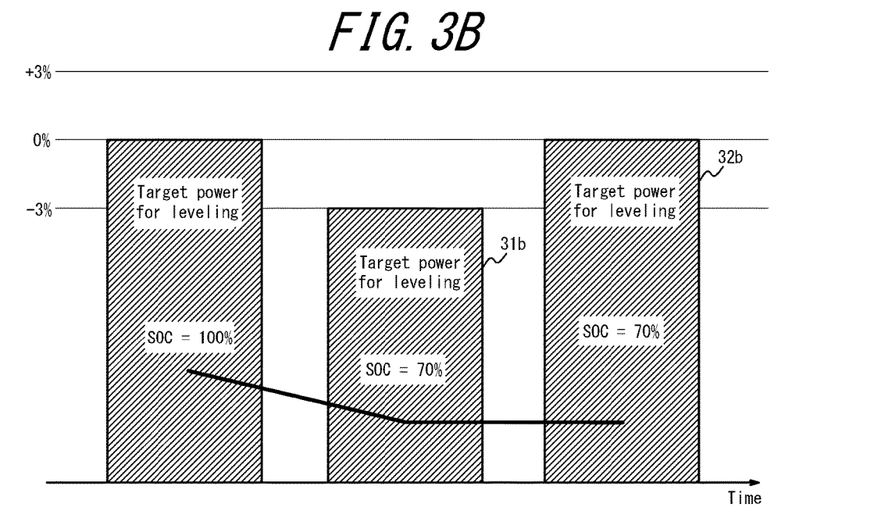
FIG. 3B illustrates an example of leveling control when decreasing the amount of stored power.

Furthermore, charging/discharging control when the target amount of stored power is 70% in terms of the State Of Charge (SOC) and the current amount of stored power is 100% in terms of the SOC is illustrated in FIG. 3B. The controller 11 may gradually increase the target power for power purchase in the leveling control as the amount of stored power in the storage cell 22 decreases. When the amount of stored power in the storage cell 22 reaches the target amount of stored power (SOC of 70%) (31b in FIG. 3B), the controller 11 sets the target power for power purchase in the leveling control to the reference value (0%) (32b in FIG. 3B).

Upon acquiring a demand response request during leveling control, the controller 11 acquires the current amount of stored power from the storage cell 22 and compares the current amount of stored power with the necessary amount of stored power for complying with the demand response request.

When determining that the current amount of stored power is equal to or greater than the necessary amount of stored power for complying with the demand response request (necessary amount of stored power for request compliance), the controller 11 continues to perform leveling control, while in a state of ensuring the necessary amount of stored power for request compliance, until reaching the time of the demand response.

Figure 4:
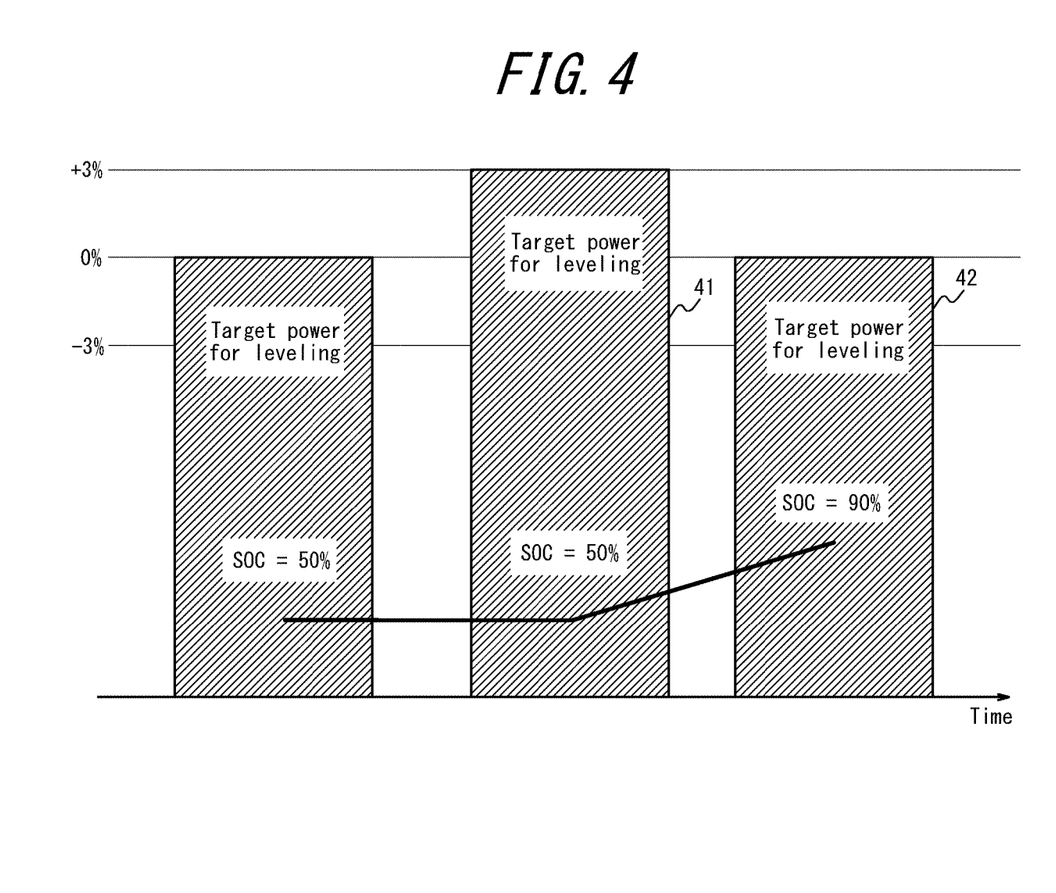
FIG. 4 illustrates an example of leveling control when increasing the amount of stored power in order to comply with a demand response request.

On the other hand, when determining that the current amount of stored power (in this embodiment, SOC of 50%) does not satisfy the necessary amount of stored power for request compliance (in this embodiment, SOC of 90%), the controller 11 sets (changes) the target power for power purchase in the leveling control for the current day to the first target value (+3%) (41 in FIG. 4), as illustrated in FIG. 4, and charges the storage cell 22.

When determining that the current amount of stored power in the storage cell 22 has reached the necessary amount of stored power for request compliance, the controller 11 sets the target power for power purchase in the leveling control to the reference value (0%) (42 in FIG. 4).

When the demand response time is reached, the consumer's facility suppresses the usage of power supplied via the grid 6. For example, the consumer's facility is notified of the demand response request, and actions to reduce the power consumption of load devices are encouraged. Therefore, the controller 11 performs demand response control and compensates for the lacking power with power charged in the storage cell 22.

After completion of the demand response, the current amount of stored power may be less than the target amount of stored power for the current day. Therefore, after completion of the demand response, the controller 11 compares the current amount of stored power in the storage cell 22 with the target amount of stored power for the current day.

Figure 5:
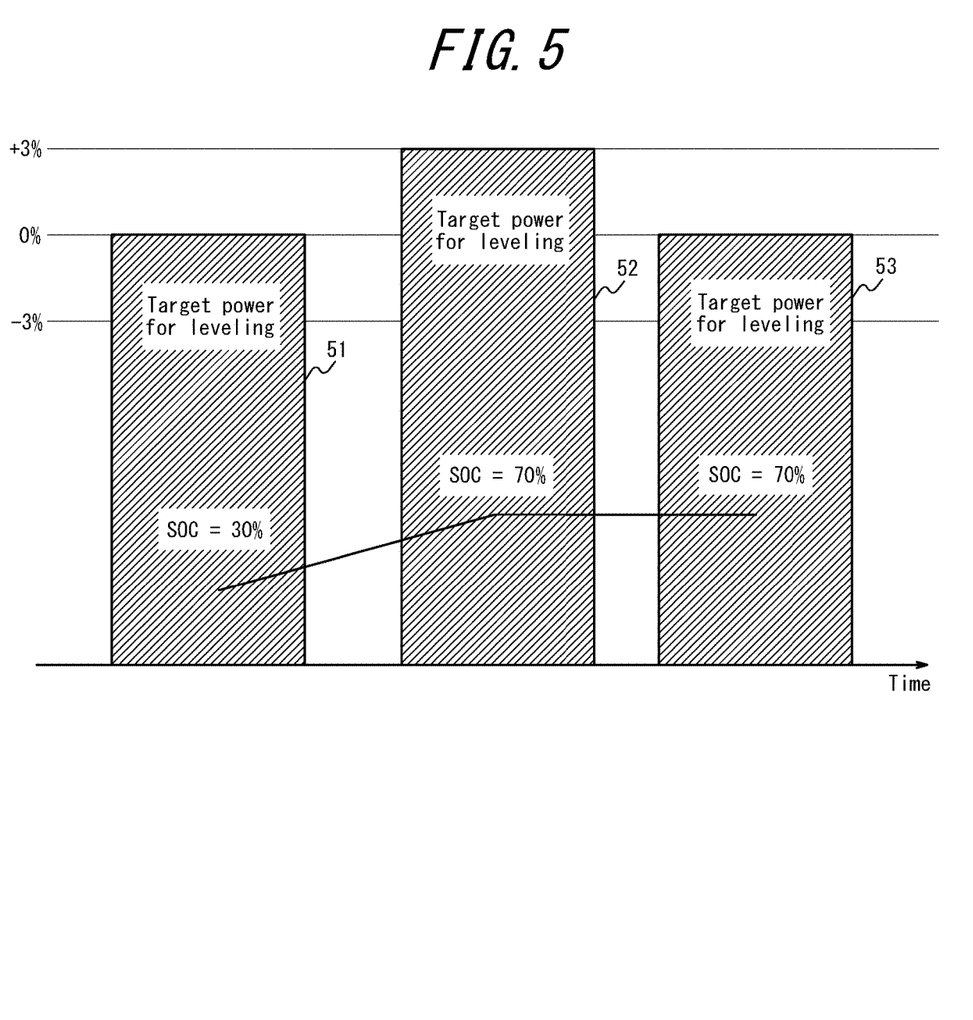
FIG. 5 illustrates an example of leveling control when increasing the amount of stored power after a demand response request.

When determining that the current amount of stored power is less than the target amount of stored power for the current day (in this embodiment, when the current amount of stored power is a SOC of 30%) (51 in FIG. 5), the controller 11 sets the target power for power purchase in the leveling control for the current day to the first target value (+3%) and implements leveling control (52 in FIG. 5). Subsequently, when determining that the current amount of stored power has reached the target amount of stored power for the current day (in this embodiment, a SOC of 70%), the controller 11 sets the target power for power purchase in the leveling control to the reference value (0%) (53 in FIG. 5).

When determining that the current amount of stored power is the same as the target amount of stored power for the current day, the controller 11 sets the target power for power purchase in the leveling control for the current day to the reference value (0%). Furthermore, when determining that the current amount of stored power is greater than the target amount of stored power for the current day, the controller 11 sets the target power for power purchase in the leveling control for the current day to the second target value (−3%) and implements leveling control. Subsequently, when determining that the current amount of stored power has reached the target amount of stored power, the controller 11 sets the target power for power purchase in the leveling control to the reference value (0%).

[Operation Flow]

Figure 6:
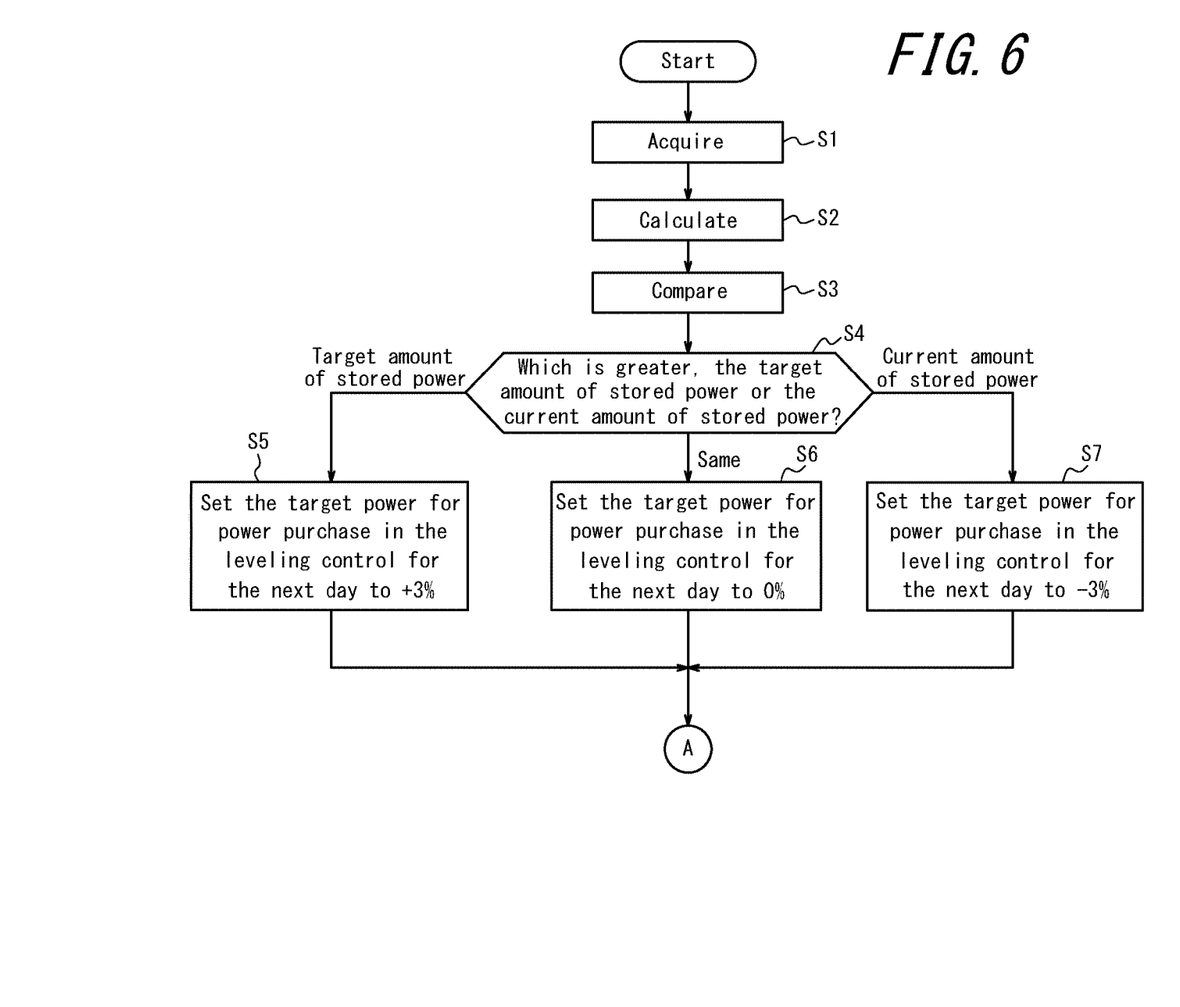
FIG. 6 is a flowchart of operations by the power control apparatus in FIG. 1.

FIG. 6 is a flowchart of operations executed by the power control apparatus 1 in FIG. 1 at any time interval.

The controller 11 acquires information on the power usage from the memory 13 and also acquires the current amount of stored power in the storage cell 22 from the power storage apparatus 2 (step S1).

The controller 11 calculates a moving average of the power usage over a recent predetermined number of days on the basis of the information on the power usage and also calculates a predicted value of the power usage on the next day using information such as the outside air temperature. The controller 11 calculates a target amount of stored power that is necessary in order to implement imbalance leveling on the next day on the basis of the predicted value of power usage (step S2).

The controller 11 compares the target amount of stored power with the current amount of stored power (step S3).

When determining that the current amount of stored power is less than the target amount of stored power (step S4), the controller 11 sets the target power for power purchase in the leveling control for the next day to the first target value (+3%) (step S5).

When determining that the current amount of stored power and the target amount of stored power are the same (step S4), the controller 11 sets the target power for power purchase in the leveling control for the next day to the reference value (0%) (step S6).

When determining that the current amount of stored power is greater than the target amount of stored power (step S4), the controller 11 sets the target power for power purchase in the leveling control for the next day to the second target value (−3%) (step S7).

Figure 7:
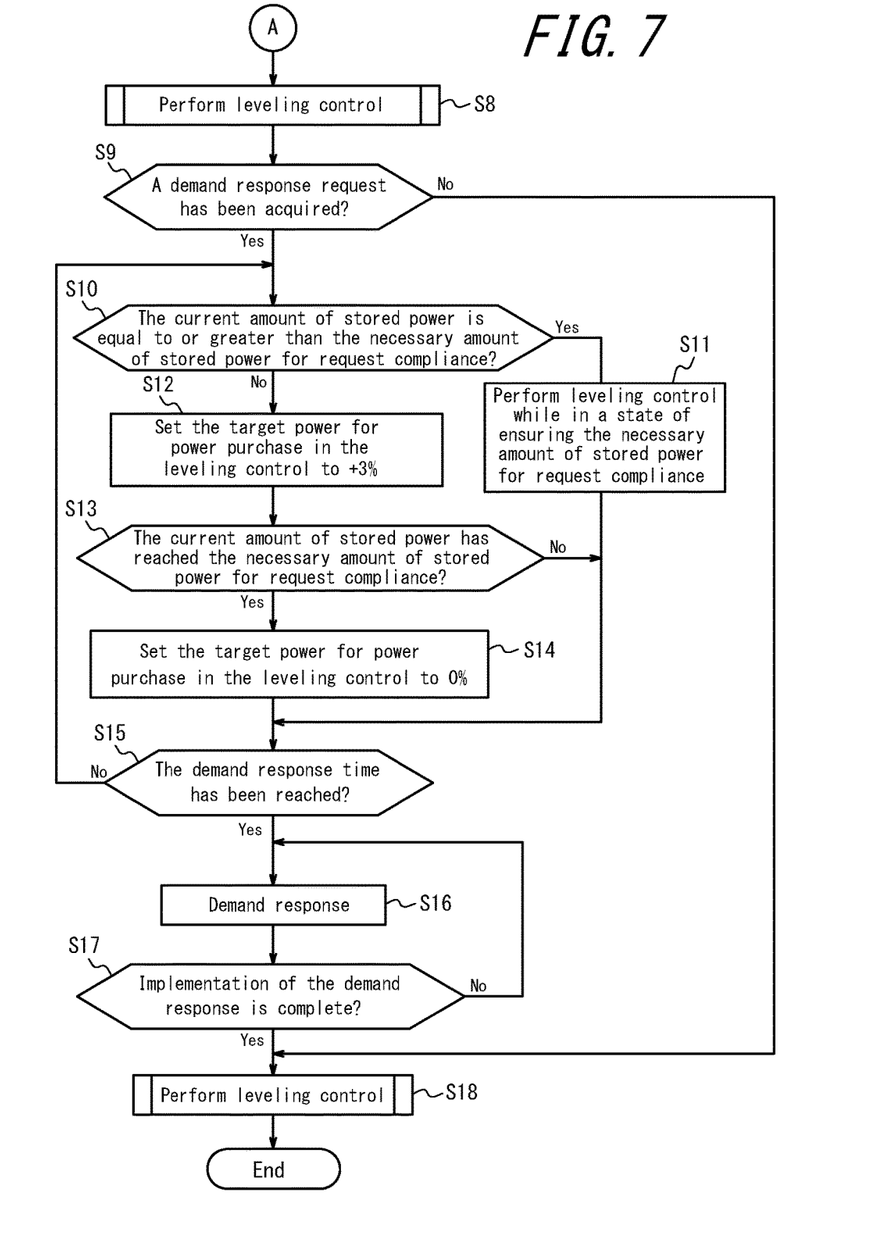
FIG. 7 is a flowchart of operations continued from FIG. 6.

As illustrated in FIG. 7, on the next day, the controller 11 performs leveling control using the storage cell 22 to achieve the target power for power purchase in the leveling control as calculated by the controller 11 on the previous day (step S8). Details on step S8 are described below with reference to FIG. 8.

After completion of the leveling control in step S8, upon acquiring a demand response request (step S9: Yes), the controller 11 acquires the current amount of stored power in the storage cell 22 from the power storage apparatus 2 and compares the current amount of stored power with the necessary amount of stored power for request compliance (step S10). When step S9 is No, the controller 11 performs the below-described step S18.

When determining that the current amount of stored power is equal to or greater than the necessary amount of stored power for request compliance (step S10: Yes), the controller 11 performs leveling control, while in a state of ensuring the necessary amount of stored power for request compliance, until reaching the time of the demand response (step S11). Next, the controller 11 performs the below-described step S15.

On the other hand, when determining that the current amount of stored power does not satisfy the necessary amount of stored power for request compliance (step S10: No), the controller 11 sets the target power for power purchase in the leveling control to the first target value (+3%) and charges the storage cell 22 (step S12).

When determining that the current amount of stored power in the storage cell 22 has reached the necessary amount of stored power for request compliance (step S13), the controller 11 sets the target power for power purchase in the leveling control to the reference value (0%) (step S14).

On the other hand, when determining that the current amount of stored power in the storage cell 22 has not reached the necessary amount of stored power for request compliance (step S13: No), the controller 11 does not perform step S14.

Next, the controller 11 determines whether the demand response time has been reached (step S15). When the demand response time has not been reached (step S15: No), the controller 11 performs step S10.

On the other hand, when determining that the demand response time has been reached (step S15: Yes), the controller 11 implements the demand response (step S16) and determines whether implementation of the demand response is complete (step S17). When determining that implementation of demand response is complete (step S17: Yes), the controller 11 implements leveling control (step S18). Details on step S18 are described below with reference to FIG. 8. When step S17 is No, the controller 11 repeats steps S16 and S17.

Figure 8:
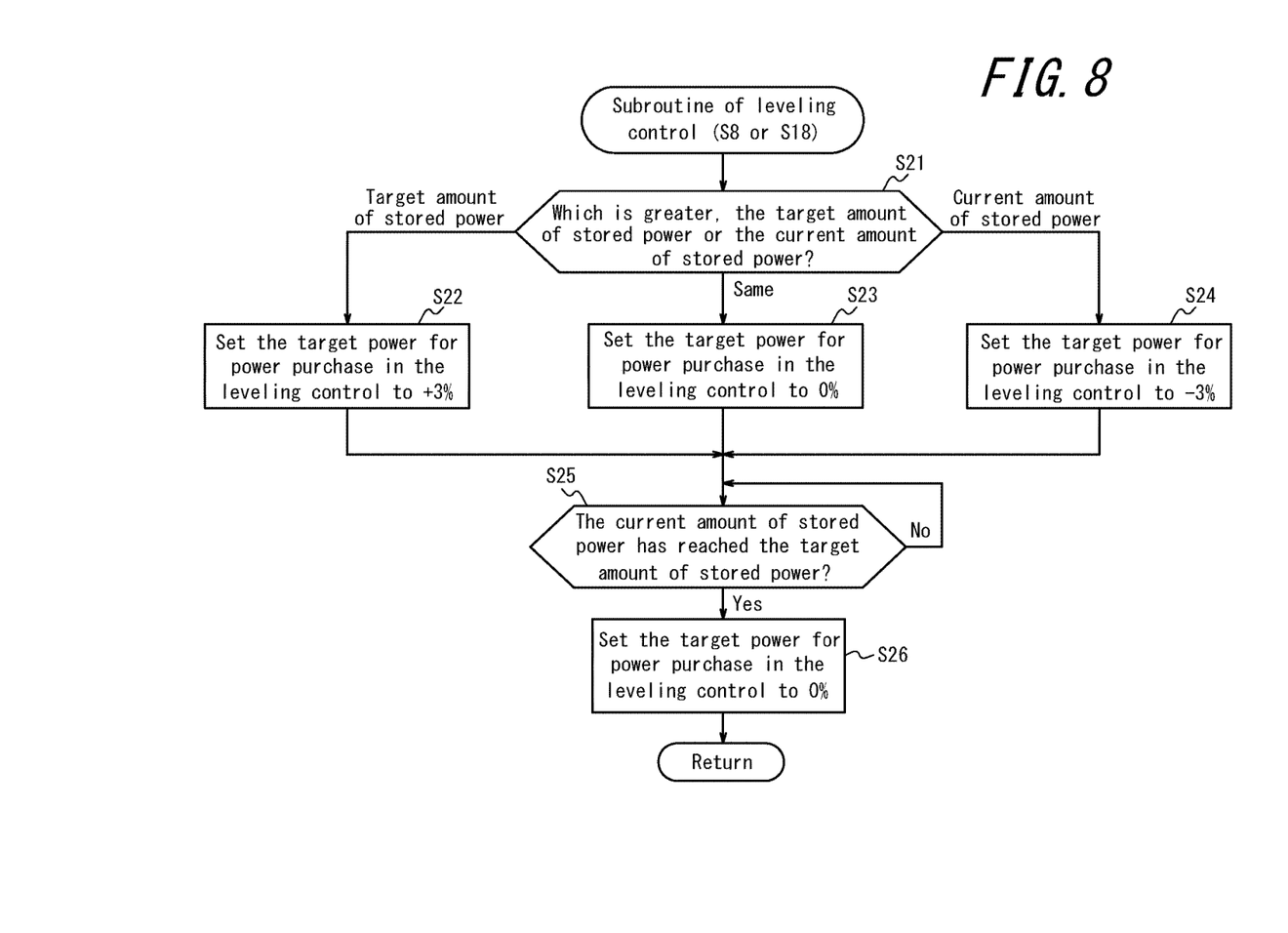
FIG. 8 illustrates a subroutine of the leveling control processing illustrated in FIG. 7.

FIG. 8 illustrates a subroutine of the leveling control in steps S8 and S18 of FIG. 7.

The controller 11 compares the target amount of stored power for the current day with the current amount of stored power, and when determining that the current amount of stored power is less than the target amount of stored power for the current day (step S21), the controller 11 sets the target power for power purchase in the leveling control for the current day to the first target (+3%) (step S22).

When determining that the current amount of stored power and the target amount of stored power are the same (step S21), the controller 11 sets the target power for power purchase in the leveling control for the current day to the reference value (0%) (step S23).

When determining that the current amount of stored power is greater than the target amount of stored power (step S21), the controller 11 sets the target power for power purchase in the leveling control for the current day to the second target value (−3%) (step S24).

When determining that the current amount of stored power has reached the target amount of stored power (step S25: Yes), the controller 11 sets the target power for power purchase in the leveling control for the current day to the reference value (0%) (step S26). In case of No at step S25, the controller 11 repeats step S25.

As described in the above embodiment, the controller 11 performs control to compare the current amount of stored power in the storage cell 22 with the necessary amount of stored power for complying with the demand response request and to set the target power for power purchase in the leveling control on the basis of the result of the comparison. Therefore, the storage cell 22 can be controlled more flexibly with respect to the power supply state of the grid 6.

As described in the above embodiment, when determining that the current amount of stored power in the storage cell 22 does not satisfy the necessary amount of stored power for complying with the demand response request, the controller 11 sets the target power to the first target value that is higher than the standard value that matches the power purchase amount at the corresponding time in the power purchase plan. Therefore, even under a restriction of needing to perform leveling, the storage cell 22 can be charged to ensure the necessary amount of stored power for the demand response, thereby making it easier to obtain an incentive.

As described in the above embodiment, when determining that the amount of stored power in the storage cell 22 after setting the first target value has reached the necessary amount of stored power, the controller 11 sets the target power to the reference value. Therefore, an imbalance fee can be prevented insofar as possible not only at the time of demand response, but also during the regular time outside of the demand response.

As described in the above embodiment, the controller 11 calculates the target amount of stored power of the storage cell 22 on the basis of the predicted value of power usage, compares the target amount of stored power with the current amount of stored power in the storage cell 22, and sets the target power for power purchase in the leveling control on the basis of the result of the comparison. Therefore, the range of selection for the SOC broadens, and usage of the storage cell 22 at an SOC of 100% can be avoided when, for example, the temperature is relatively low due to rain or the like, making use of the air conditioner unnecessary, and the power variation is small. Accordingly, degradation of the storage cell 22 can be slowed down, extending the life of the cell. By extending the life of the cell, additional capacity to the storage cell 22 becomes unnecessary, thereby reducing the cost of the storage cell 22. Also, use of the storage cell 22 at a SOC of 0% can be avoided, thereby preventing depletion of the amount of stored power in the storage cell 22 during leveling.

Furthermore, as described in the above embodiment, on the basis of the power purchase amount established in the power purchase plan, the controller 11 sets the target power to be within a range over which the imbalance fee per unit amount of power varies (−3% or 3%). Therefore, the need to sell generated power at a low price can be avoided, and the need to purchase power at a high price can be avoided.

Furthermore, as described in the above embodiment, when determining that the current amount of stored power in the storage cell is equal to or greater than the necessary amount of power for complying with the demand response request, the controller 11 ensures the necessary amount of power for complying with the demand response request. The controller 11 then performs leveling control, while in a state of ensuring the necessary amount of stored power, until reaching the time of the demand response. Therefore, while maintaining a state in which a demand response request can be complied with, the occurrence of a penalty due to the leveling can be reduced.

Although an embodiment of the present disclosure has been described on the basis of drawings and examples, it is to be noted that various changes and modifications will be apparent to those skilled in the art on the basis of the present disclosure. Therefore, such changes and modifications are to be understood as included within the scope of the present disclosure. For example, the functions and the like included in the various members, units, steps, and the like may be reordered in any logically consistent way. Furthermore, when embodying a method according to the present disclosure, units or steps may be combined into one or divided.

The control of the present disclosure is described as a series of operations executed by a computer system and other hardware that can execute program instructions. Examples of the computer system and other hardware include a general-purpose computer, a Personal Computer (PC), a dedicated computer, a workstation, and other programmable data processing apparatuses. It should be noted that in each embodiment, various operations are executed by a dedicated circuit (for example, individual logical gates interconnected in order to execute a particular function) implemented by program instructions (software), or by a logical block, program module, or the like executed by one or more processors. The one or more processors that execute a logical block, program module, or the like are, for example, one or more of each of the following: a microprocessor, a Central Processing Unit (CPU), an Application Specific Integrated Circuit (ASIC), a Digital Signal Processor (DSP), a Programmable Logic Device (PLD), a Field Programmable Gate Array (FPGA), a controller, a microcontroller, an electronic device, another apparatus designed to be capable of executing the functions disclosed herein, and/or a combination of any of the above. The disclosed embodiments are, for example, implemented by hardware, software, firmware, middleware, microcode, or a combination of any of these.

The network used here may, unless indicated otherwise, be the Internet, an ad hoc network, a Local Area Network (LAN), a cellular network, another network, or a combination of any of these.

REFERENCE SIGNS LIST

1 Power control apparatus
11 Controller
12 Communication interface
13 Memory
2 Power storage apparatus
21 PCS
22 Storage cell
3 PPS server/aggregator server
4 Power company server
5 Measurement apparatus
6 Grid
70 Power company
80 Power control system
90 Network

The invention claimed is:

1. A power control apparatus that connects to a grid and is capable of controlling charging and discharging of a storage cell, the power control apparatus comprising:
a controller configured to reduce a difference from a power purchase amount by controlling charging and discharging of the storage cell, the power purchase amount being established in a power purchase plan;
wherein the controller is further configured, upon acquiring a demand response request issued over a network, to make a comparison between a current amount of stored power in the storage cell and an amount of stored power necessary to comply with the demand response request, and to set a target power for power purchase from the grid on the basis of a result of the comparison,
wherein the demand response request is a request to reduce power usage at a predetermined time after the demand response request is received by the controller, and
wherein as a result of the comparison, when determining that the current amount of stored power in the storage cell does not satisfy the amount of stored power necessary to comply with the demand response request, the controller sets the target power to a first target value higher than a standard value that matches the power purchase amount at a corresponding time in the power purchase plan.

2. The power control apparatus of claim 1, wherein when determining that the amount of stored power in the storage cell after setting the first target value has reached the necessary amount of stored power, the controller sets the target power to the reference value.

3. The power control apparatus of claim 1, wherein the controller calculates a target amount of stored power in the storage cell on the basis of a predicted value of power usage, makes a comparison between the target amount of stored power and the current amount of stored power in the storage cell, and sets the target power on the basis of the result of the comparison.

4. The power control apparatus of claim 1, wherein on the basis of the power purchase amount established in the power purchase plan, the controller sets the target power to be within a range over which an imbalance fee per unit amount of power varies.

5. A power control method used in a power control apparatus that connects to a grid and is capable of controlling charging and discharging of a storage cell, the power control method including:
when a difference from a power purchase amount is reduced by controlling charging and discharging of the storage cell, the power purchase amount being established in a power purchase plan,
making a comparison, upon acquiring a demand response request issued over a network, between a current amount of stored power in the storage cell and an amount of stored power necessary to comply with the demand response request, and to set a target power for power purchase from the grid on the basis of a result of the comparison,
wherein the demand response request is a request to reduce power usage at a predetermined time after the demand response request is received by the power control apparatus, and
setting the target power to a first target value higher than a standard value that matches the power purchase amount at a corresponding time in the power purchase plan, when the current amount of stored power in the storage cell is determined, as a result of the comparison, not to satisfy the amount of stored power necessary to comply with the demand response request.

6. The power control method of claim 5, further including performing control, when the current amount of stored power in the storage cell is determined to be equal to or greater than the necessary amount of power necessary to comply with the demand response request, until reaching a time of the demand response while in a state of ensuring the necessary amount of stored power which complies with the demand response request.

7. A power control system comprising:
a power storage apparatus comprising a storage cell; and
a power control apparatus that connects to a grid and is capable of controlling charging and discharging of the storage cell;
wherein the power control apparatus comprises a controller configured to perform leveling control to reduce a difference from a power purchase amount by controlling charging and discharging of the storage cell, the power purchase amount being established in a power purchase plan; and
wherein the controller is further configured, upon acquiring a demand response request issued over a network, to make a comparison between a current amount of stored power in the storage cell and a state of charge necessary to comply with the demand response request, and to set a target power for power purchase from the grid in the leveling control on the basis of a result of the comparison,
wherein the demand response request is a request to reduce power usage at a predetermined time after the demand response request is received by the controller, and
wherein as a result of the comparison, when determining that the current amount of stored power in the storage cell does not satisfy the amount of stored power necessary to comply with the demand response request, the controller sets the target power to a first target value higher than a standard value that matches the power purchase amount at a corresponding time in the power purchase plan.

8. The power control system of claim 7, wherein when determining that the current amount of stored power in the storage cell is equal to or greater than the amount of power necessary to comply with the demand response request, the controller performs the leveling control, while in a state of ensuring the necessary amount of stored power which complies with the demand response request, until reaching a time of the demand response.

* * * * *